(12) United States Patent
Lee et al.

(10) Patent No.: US 11,599,361 B2
(45) Date of Patent: Mar. 7, 2023

(54) FLUSHING A FETCH QUEUE USING PREDECODE CIRCUITRY AND PREDICTION INFORMATION

(71) Applicant: Arm Limited, Cambridgeshire (GB)

(72) Inventors: Jaekyu Lee, Austin, TX (US); Yasuo Ishii, Austin, TX (US); Krishnendra Nathella, Austin, TX (US); Dam Sunwoo, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/315,737

(22) Filed: May 10, 2021

(65) Prior Publication Data
US 2022/0357953 A1 Nov. 10, 2022

(51) Int. Cl.
G06F 9/38 (2018.01)
(52) U.S. Cl.
CPC ............ G06F 9/3806 (2013.01); G06F 9/382 (2013.01); G06F 9/3861 (2013.01)
(58) Field of Classification Search
CPC .... G06F 9/3861; G06F 9/382; G06F 9/30145; G06F 9/3844
See application file for complete search history.

(56) References Cited

U.S. PATENT DOCUMENTS

| | | | | |
|---|---|---|---|---|
| 4,853,840 A * | 8/1989 | Shibuya | ................ | G06F 9/3844 712/237 |
| 5,805,876 A * | 9/1998 | Bose | ..................... | G06F 9/3804 712/216 |
| 6,385,720 B1 * | 5/2002 | Tanaka | .................. | G06F 9/3844 712/213 |
| 6,598,154 B1 * | 7/2003 | Vaid | ....................... | G06F 9/3844 712/213 |
| 2009/0187744 A1 * | 7/2009 | Greenhalgh | .......... | G06F 9/3802 712/213 |
| 2011/0055523 A1 * | 3/2011 | Kaplan | ................. | G06F 9/3822 712/214 |

OTHER PUBLICATIONS

Y. Ishii, J. Lee, K. Nathella and D. Sunwoo, "Re-establishing Fetch-Directed Instruction Prefetching: An Industry Perspective," 2021 IEEE International Symposium on Performance Analysis of Systems and Software (ISPASS), Mar. 28-30, 2021, pp. 172-182 (Year :2021).*

(Continued)

*Primary Examiner* — Keith E Vicary
(74) *Attorney, Agent, or Firm* — Nixon & Vanderhye P.C.

(57) ABSTRACT

A data processing apparatus is provided. It includes control flow detection prediction circuitry that performs a presence prediction of whether a block of instructions contains a control flow instruction. A fetch queue stores, in association with prediction information, a queue of indications of the instructions and the prediction information comprises the presence prediction. An instruction cache stores fetched instructions that have been fetched according to the fetch queue. Post-fetch correction circuitry receives the fetched instructions prior to the fetched instructions being received by decode circuitry, the post-fetch correction circuitry includes analysis circuitry that causes the fetch queue to be at least partly flushed in dependence on a type of a given fetched instruction and the prediction information associated with the given fetched instruction.

17 Claims, 10 Drawing Sheets

(56) References Cited

OTHER PUBLICATIONS

Ishii et al., "Rebasing Instruction Prefetching: An Industry Perspective", *IEEE Computer Architecture Letters*, vol. 10, Sep. 2020, pp. 1-5.

Adiga et al., "The IBM z15 High Frequency Mainframe Branch Predictor", *2020 ACM/IEEE 47$^{TH}$ Annual International Symposium on Computer Architecture (ISCA)*, Jul. 13, 2020, pp. 27-39.

\* cited by examiner

Without post-fetch correction:

With post-fetch correction:

FLUSHING A FETCH QUEUE USING PREDECODE CIRCUITRY AND PREDICTION INFORMATION

TECHNICAL FIELD

The present disclosure relates to data processing. In particular, the present disclosure relates to control flow prediction.

DESCRIPTION

Control flow prediction, such as branch prediction, is a technique used to predict the outcome of a control flow instruction prior to the control flow instruction being executed. This makes it possible to continue to fetch and decode instructions without waiting for the branch to first resolve, thereby maintaining bandwidth of the processing pipeline.

SUMMARY

Viewed from a first example configuration, there is provided a data processing apparatus comprising: control flow detection prediction circuitry to perform a presence prediction of whether a block of instructions contains a control flow instruction; a fetch queue configured to store, in association with prediction information, a queue of indications of the instructions, wherein the prediction information comprises the presence prediction; an instruction cache configured to store fetched instructions that have been fetched according to the fetch queue; and post-fetch correction circuitry configured to receive the fetched instructions prior to the fetched instructions being received by decode circuitry, the post-fetch correction circuitry comprising: analysis circuitry configured to cause the fetch queue to be at least partly flushed in dependence on a type of a given fetched instruction and the prediction information associated with the given fetched instruction.

Viewed from a second example configuration, there is provided a data processing method comprising: performing a presence prediction of whether a block of instructions contains a control flow instruction; storing in a fetch queue, in association with prediction information, a queue of indications of the instructions, wherein the prediction information comprises the presence prediction; storing fetched instructions that have been fetched according to the fetch queue; and receiving the fetched instructions prior to the fetched instructions being received by decode circuitry and causing the fetch queue to be at least partly flushed in dependence on a type of a given fetched instruction and the prediction information associated with the given fetched instruction.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: control flow detection prediction circuitry to perform a presence prediction of whether a block of instructions contains a control flow instruction; a fetch queue configured to store, in association with prediction information, a queue of indications of the instructions, wherein the prediction information comprises the presence prediction; an instruction cache configured to store fetched instructions that have been fetched according to the fetch queue; and post-fetch correction circuitry configured to receive the fetched instructions prior to the fetched instructions being received by decode circuitry, the post-fetch correction circuitry comprising: analysis circuitry configured to cause the fetch queue to be at least partly flushed in dependence on a type of a given fetched instruction and the prediction information associated with the given fetched instruction.

The control flow detection prediction circuitry is able to determine, for a block of (e. g. 8) instructions, whether that block of instructions contains a control flow instruction (e. g. a branch instruction or a return instruction). The control flow detection circuitry is not always accurate. In particular, not only might this circuitry predict that a block does or does not have a control flow instruction, it might also have no data whatsoever as to whether the block contains an instruction (in which case, a default might be to assume that no control flow instruction is present). Such a situation could occur due to a limited capacity of the control flow detection prediction circuitry. The fetch queue is used to store indications of instructions to be fetched into the instruction cache. These indications could, for instance, be virtual addresses of instruction lines. The prediction information includes the presence prediction—which could indicate whether a control flow instruction such as a branch is 'known'/'not known' to exist within the block. The head entry of the fetch queue is used to fetch the corresponding instruction from the memory hierarchy (e. g. a lower level cache or even main memory). The post-fetch correction circuitry considers the instructions in the instruction cache (e. g. before those instructions are decoded by a main decode stage of the pipeline). The post-fetch correction circuitry might then cause some or all of the fetch queue to be flushed based on both the type of the instruction as well as the prediction information in associated with that instruction. The apparatus considers the fact that the fetch queue is established according to the control flow detection prediction circuitry. For instance, if the control flow detection prediction circuitry predicts that there is no control flow instruction in a block of instructions, it might be safe to assume that the next block of instructions to be fetched is the next block of instructions in sequence. That is, if block A is predicted to not contain a control flow instruction then the fetch queue could contain 'A' in a head position, and 'A+1' in the next position because block 'A+1' would be the next sequential block of instructions to fetch. However, the control flow detection prediction circuitry might be wrong and/or might not have enough information to perform its prediction correctly. Rather than waiting for each of the instructions to resolve before discovering that a control flow instruction actually existed and then having to flush the entire pipeline, the post-fetch correction circuitry is able to use a type of the instruction (and what prediction information is available) to consider flushing the fetch queue. Correction for the inaccuracy of the control flow detection prediction circuitry therefore occurs more quickly. The fetched instructions are received by the post-fetch correction circuitry prior to being received by decode circuitry. This refers to the current instance of the instruction in the instruction stream. The same instruction could, of course, have been previously encountered and decoded earlier in the instruction stream.

In some examples, the post-fetch correction circuitry comprises: predecode circuitry, separate from the decode circuitry, configured to perform an initial decoding of the fetched instructions to provide the type of the given fetched instruction. The predecode circuitry is used to perform a predecoding. This differs from the decoding performed by the previously mentioned decode circuitry in that the predecoding is not a complete decoding. For instance, only certain bits of the opcode corresponding to the instruction might be decoded. In some examples, at least some of the parameters of the instruction are not decoded. Specifically, the predecoding makes it possible to determine whether the fetched instructions are control flow instructions. In some examples, no further decoding occurs. Since the predecoding is not a complete decoding, it can be performed more quickly than a full decoding can be performed, thereby maintaining a bandwidth of the fetching process.

In some examples, the predecode circuitry is configured to perform the initial decoding on a head instruction indicated by a head of the fetch queue. While the instruction cache can include both instructions that have already been sent for decoding as well as instructions that are not at a head of the fetch cache, the predecode circuitry in these examples performs the initial decoding on a head instruction as indicated by the head entry of the fetch queue. Having performed this initial decoding, the post-fetch correction circuitry does its analysis and (potentially in parallel) the instruction is sent to the next stage of the pipeline (e. g. full decoding).

In some examples, the data processing apparatus comprises: control flow direction prediction circuitry configured to perform a direction prediction of the control flow instruction; and the prediction information comprises the direction prediction. The direction predictor can be used to predict the direction (and/or location) to which a given instruction will cause the program to flow. In some cases, this includes a 'taken'/'not taken' indicator, but could also include an indication of where such a branch will flow to (e. g. an instruction address).

In some examples, the control flow direction prediction circuitry is configured to perform the direction prediction on each instruction within the block of instructions. In these examples, the control flow direction prediction circuitry performs a control flow direction prediction on instructions regardless of whether they are control flow instructions or not. In the case of non-control flow instructions, the result could simply have no meaning.

In some examples, the control flow direction prediction circuitry is configured to perform the direction prediction based on a global history; and the analysis circuitry is configured, in response to causing the fetch queue to be at least partly flushed, to cause the global history to be corrected. The global history could, for instance, be a global branch history. For example, rather than only considering the local information on a control flow instruction to predict a behaviour of that control flow instruction (e. g. the previous behaviour of that specific instruction), one could consider the sequence of instructions (e. g. control flow instructions and their outcomes) that have been followed. Examples of such branch predictors include TAGE and Perceptron.

In some examples, the analysis circuitry is configured to cause the fetch queue to be at least partly flushed in response to the given instruction when the type of the given fetched instruction and the prediction information indicate that the contents of the fetch queue are incorrect. If the system waits for confirmation from a branch execution unit, then this not only takes several more processor cycles to complete but will cause the pipeline to be flushed anyway. By simply flushing the fetch queue immediately, a lesser corrective action needs to be taken. Furthermore the corrective action is taken sooner and thus fewer processor cycles are wasted. Since the prediction is made using a more accurate prediction it might be expected that such corrective action is less likely to result in a full pipeline flush being needed later.

In some examples, the type of the given fetched instruction and the prediction information indicate that the contents of the fetch queue are incorrect when the type of the given instruction and the prediction information indicate that a sequential fetch was performed to fill the fetch queue and the type of the given instruction and the prediction information indicate that the sequential fetch differs from a control flow indicated by the given instruction post-decoding. In these examples, if the type of instruction (e. g. that it is a control flow instruction) and the prediction information (e. g. that there was no control flow instruction) indicate that the contents of the fetch queue might be incorrect then at least some of the fetch queue is flushed. In this example, if the instruction is a control flow instruction and the original prediction was that no control flow instruction existed then the fetch queue has likely been filled with blocks of instructions in that proceed in a sequential manner. It could therefore be concluded that there is some probability that the fetch queue is incorrectly filled. Where the prediction information includes detail of the branch prediction itself, a more accurate prediction can be made—for instance, if the branch direction prediction also indicates that the branch instruction is taken, then the prediction would be that the fetch queue is incorrect. Rather than wait for the instruction to be executed to confirm this, which might take several processor cycles, the fetch queue can simply be flushed immediately. Thus, a more accurate prediction of the control flow instruction is used to proceed to execution.

In some examples, the analysis circuity is configured to cause the fetch queue to be at least partly flushed in response to the given instruction when the type of the given instruction indicates that the given instruction is a conditional control flow instruction and the direction prediction indicates that the conditional control flow instruction is taken and the presence prediction indicates that the block of instructions lacked a control flow instruction. The type of the instruction in these examples not only indicates whether the instruction is a control flow instruction but also what type of control flow instruction it is. Here, if it is determined that the instruction is a conditional control flow instruction (e. g. that the control flow might or might not change from sequential ordering) and if the direction prediction also predicts that the control flow instruction is likely to be taken (e. g. that a non-sequential ordering is likely) and if the presence prediction indicates that the block of instructions containing the instruction in question (the given instruction) did not contain a control flow instruction (e. g. that the fetch queue has been built sequentially) then one can conclude that the fetch queue is likely to be wrong and therefore that an immediate at least partial flush of the fetch queue should take place. In practice, the flush might be expected to cover any instructions following the given instruction.

In some examples, the analysis circuitry is configured to cause the fetch queue to be at least partly flushed in response to the given instruction when the type of the given instruction indicates that the given instruction is an unconditional control flow instruction and the presence prediction indicates that the block of instructions lacked a control flow instruction. Another situation in which an at least partial flush of the fetch queue might take place is where the given instruction is an unconditional control flow instruction (e. g. the control flow instruction is always taken). If, however, the presence prediction did not predict the existence of a control flow instruction within the block then the instructions in the fetch queue following the given instruction have likely been fetched in a sequential manner and so those instructions can be flushed.

In some examples, the post-fetch correction circuitry is selectively applied to the given fetched instruction. In some situations, the post-fetch correction circuitry might perform an incorrect correction thereby causing a pipeline flush when the branch instruction is finally executed. In order to reduce the chances of this happening, the post-fetch correction circuitry can be selectively applied so that it is only used on certain instructions (or certain instruction types for instance).

There are a number of ways in which the post-fetch correction circuitry can be selectively applied. However in some examples, the post-fetch correction circuitry is selectively applied to the given fetched instruction in dependence on a confidence value associated with whether the post-fetch correction circuitry would have previously correctly flushed the fetch queue. For example, control flow instructions can be categorised based on a confidence (e. g. high or low confidence). This confidence can, for instance, be obtained from a control flow direction predictor. For each category, a counter (e. g. a saturated counter) can be maintained that indicates whether the use of the post-fetch correction circuitry has been successful. When the counter reaches a threshold, the post-fetch correction circuitry is applied.

In some examples, the post-fetch correction circuitry is selectively applied to the given fetched instruction in dependence on one or more compiler hints. A compiler, having a global view of an entire program, is able to perform profiling that can determine, more accurately, whether a control flow instruction is likely to be taken at any time. In these examples, the compiler is able to use the results of such profiling to store 'hints' within the instruction code itself. This can be achieved, for instance, by particular instructions that write the hints to a given register, the given register being read by the post-fetch correction circuitry so that a more accurate prediction can be made as to whether a control flow instruction should be taken. For instance, profiling carried out by a compiler might indicate that a control flow instruction is taken a certain percentage of the time. This percentage can then be compared to, for instance, the branch direction predictor to indicate whether the prediction produced by the branch direction predictor is correct and therefore whether an at least partial flush of the fetch queue should take place.

In some examples, the instruction cache is configured, in response to an entry of the fetch queue causing a miss in the instruction cache, to perform a fill from a lower level cache of a cache line corresponding to the entry and comprising a plurality of cache line instructions; and the predecode circuitry is configured to perform the initial decoding on each of the plurality of cache line instructions in response to the fill. In these examples, the predecoding takes place at a time of a cache miss when a cache line (that contains a number of instructions) is fetched into the instruction cache. At this point, the predecode circuitry is used to perform predecoding on each of the instructions within the cache line. This has the result that instructions not at a head of the fetch queue can be analysed by the predecode circuitry, if an at least partial flush then takes place, the at least partial flush will affect instructions prior to the one being analysed. This has the effect that the at least partial flush is carried out sooner and affects less of the fetch queue, reducing performance degradation as a result of the flush.

In some examples, the data processing apparatus comprises: an instruction buffer, configured to store further fetched instructions, wherein the further fetched instructions are indicated at a location in the fetch queue other than the head; the post-fetch correction circuitry is configured to receive the further fetched instructions; the predecode circuitry is configured to perform the initial decoding on the further fetched instructions; and the analysis circuitry is configured to cause the fetch queue to be at least partly flushed in dependence on the initial decoding of a given further fetched instruction and the prediction information associated with the given further fetched instruction. In these examples, the post-fetch correction circuitry directly operates on non-head entries of the fetch queue. To help with this, the instruction buffer is provided.

In some examples, the instruction cache is configured to store, in association with the given fetched instruction, the type of the given fetched instruction; and the decode circuitry is configured to provide the type of the given fetched instruction to be stored in the instruction cache in response to the given fetched instruction being decoded by the decode circuitry. In these examples, a previous full decoding (e. g. by the decode stage of the pipeline) is used to generate the type of the given fetched instruction. Thereafter, this type information can be stored in the instruction cache so that the next time the instruction is sent for execution, the type information is available. Note that in these examples, the post-fetch correction circuitry operates on a given instance (e. g. occasion) of an instruction in the stream prior to that instance being sent to be decoded in the decode stage. The type information comes from a previous instance of that same instruction. This might occur, for instance, in a loop or in a recursive function. In these examples, since the type information is known from the full decoding process, a predecoding need not occur. Consequently, the post-fetch correction process can proceed more quickly, meaning that it need not be applied only to a head of the instruction cache.

Particular embodiments will now be described with reference to the figures.

Figure 1:
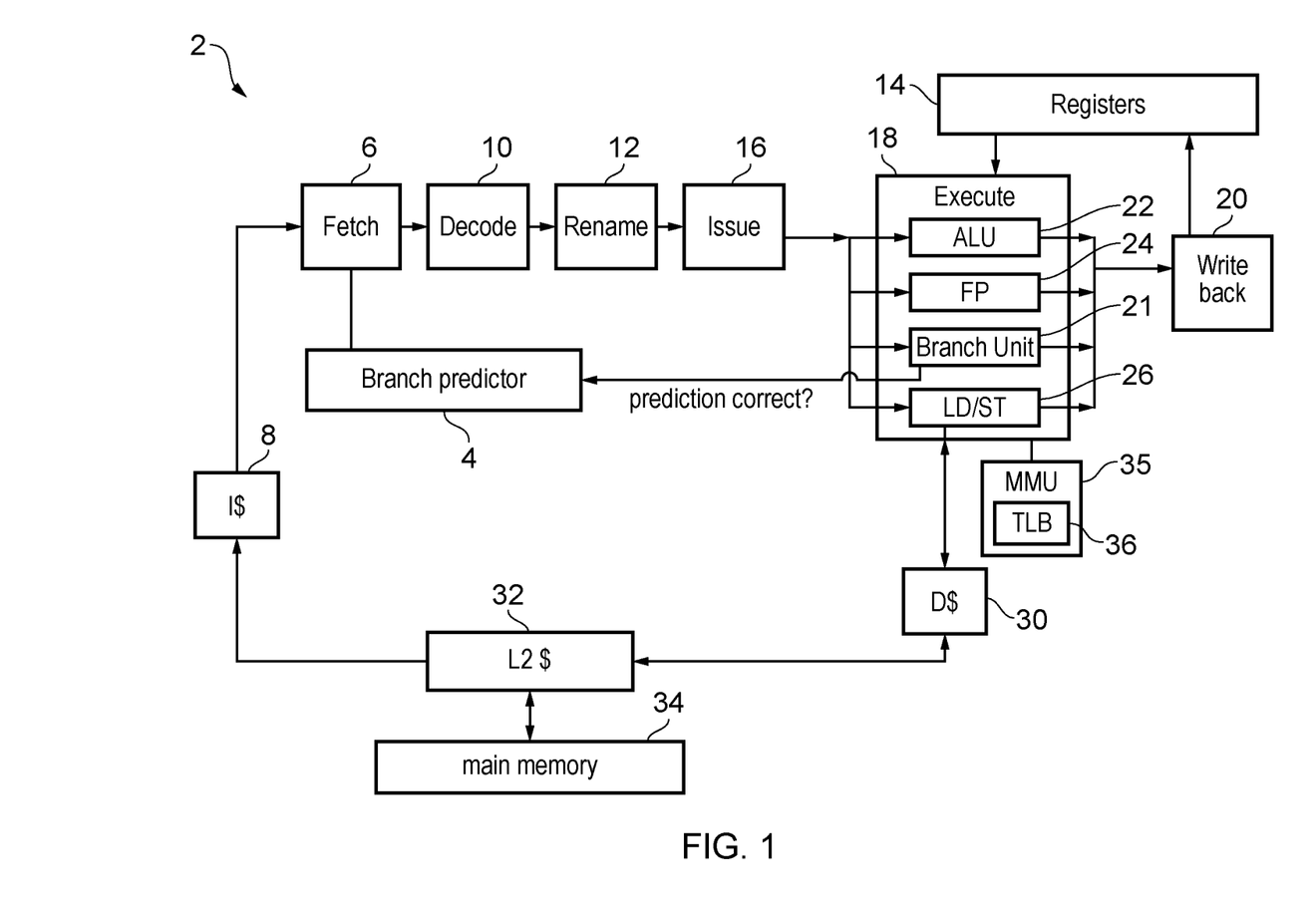
FIG. 1 schematically illustrates an example of a data processing apparatus.

FIG. 1 schematically illustrates an example of a data processing apparatus 2 having a processing pipeline comprising a number of pipeline stages. The pipeline includes a branch predictor 4 for predicting outcomes of branch instructions. A fetch stage 6 generates a series of fetch addresses based on the predictions made by the branch predictor 4. The fetch stage 6 fetches the instructions identified by the fetch addresses from an instruction cache 8. A decode stage 10 decodes the fetched instructions to generate control information for controlling the subsequent stages of the pipeline. Optionally, a rename stage 12 may be provided to perform register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the instruction cache 8, which can improve performance by allowing a later instruction to execute while an earlier instruction is waiting for an operand to become available. The ability to map architectural registers to different physical registers can also facilitate the rolling back of architectural state in the event of a branch misprediction. In an in-order pipeline however, the rename stage may not be provided.

An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement (e. g. the level two cache 32 may not be shared, but instead separate L2 instruction and data caches could be provided). Access to memory may be controlled using a memory management unit (MMU) 35 for controlling address translation and/or memory protection. The load/store unit 26 may use a translation lookaside buffer (TLB) 36 of the MMU 35 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

Figure 2:
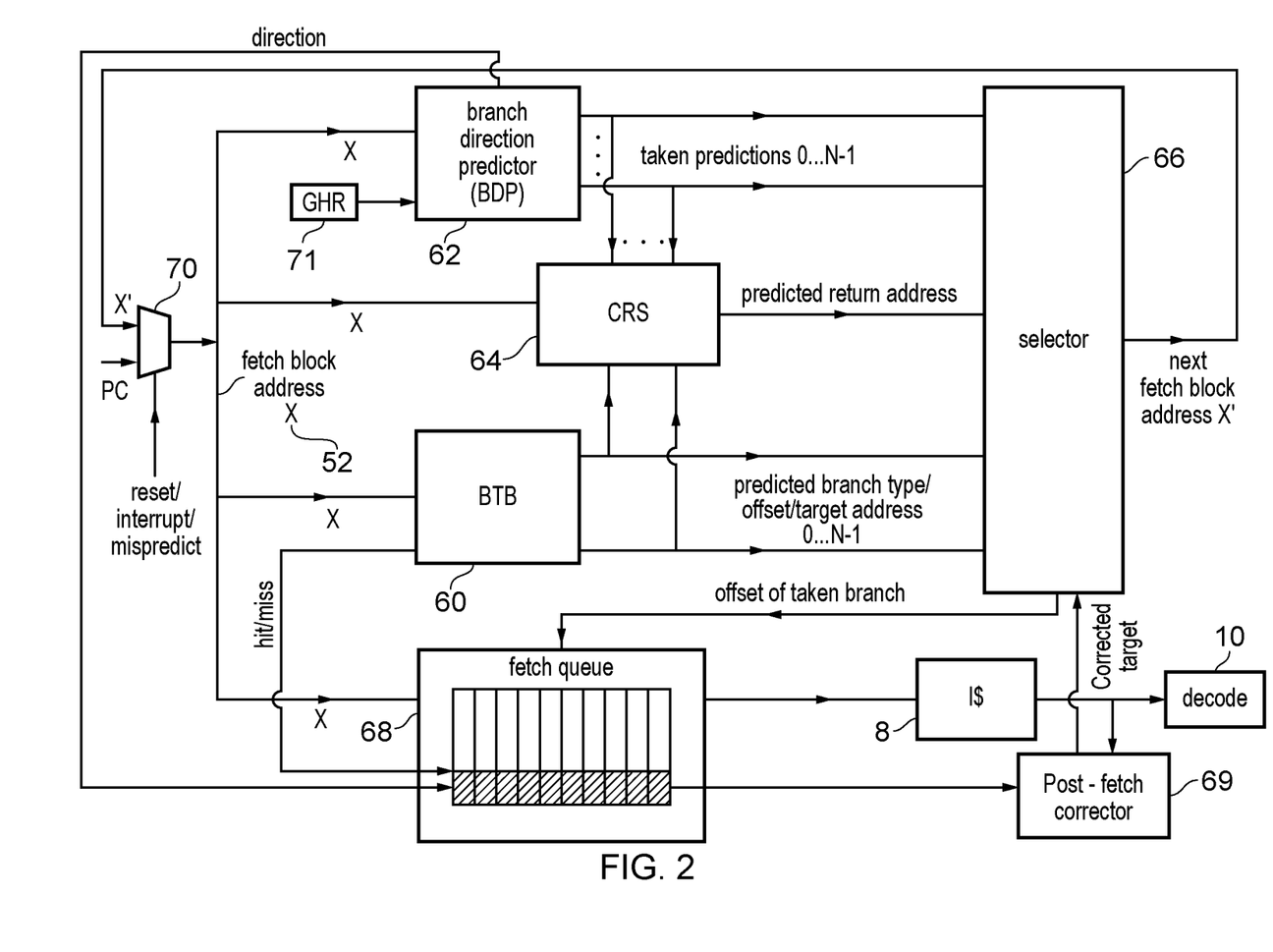
FIG. 2 shows an example of components of the branch predictor in accordance with some examples.

FIG. 2 shows an example of components of the branch predictor 4, including a branch target buffer (BTB) 60, a branch direction predictor (BDP) 62 and a call-return stack (CRS) 64. In each cycle of branch prediction, the fetch block address X 52 representing the address of the next instruction to be fetched by the fetch stage 6 is input to the BTB 60, BDP 62 and CRS 64. The BTB 60 and BDP 62 both include a storage structure for storing various branch prediction state entries. In the case of the BDP 62, the branch prediction state entries provide a prediction of whether (if there is any conditional branch instruction within the block of instructions represented by the fetch block address X), those instructions should be taken or not taken. The BDP 62 can be implemented according to any known type of branch predictor, such as TAGE, perceptron, gskew, etc. (this list is not exhaustive). Some techniques (such as TAGE and perceptron) make use of a global history register (GHR) 71, which stores a history of the outcome of recent control flow instructions and this information is used as part of the prediction made by the BDP 62. Note that the storage space available to the BTB in particular in limited. Consequently, for a given fetch block address X 52, a miss might occur in the BTB (suggesting there is no branch) even though such a branch exists. Also in these examples, the BDP is used to provide a branch direction prediction for each instruction (even those that are not control flow instructions).

The BTB 60 includes a number of entries which provide predictions of one or more of: whether there are any branches expected to be included in the block of instructions identified by the fetch block address X, the offsets of those branches relative to the fetch block address X, the types of the predicted branches, and for at least some branch types, a predicted target address for the branch. Here, the target address refers to the address to which program flow is to be directed if the branch is taken.

Hence, for branches other than return branch instructions, the BTB 60 may provide a prediction of the branch type, offset and target address of the predicted branches, and if any of the branches are conditional branches, then the BDP 62 provides predictions of whether those branches are taken or not taken. Based on the predictions provided by the BTB 60 and the BDP 62, a selector 66 selects which program instruction address is to be used as the next fetch block address X in the next branch prediction cycle. Also, based on the offsets of any taken branches, the selector 66 determines how many instructions of the current fetch block identified by fetch block address X will need to be fetched, and provides a signal to a fetch queue 68 which queues addresses of instructions to be fetched by the fetch stage 6, to ensure that all instructions up to the first taken branch within the current fetch block will be fetched by the fetch stage 6. The fetch queue 68 is used to control fetching instructions from the instruction cache 8 by the fetch stage 6. The fetched instructions are decoded by the decode stage 10. Entry into the instruction cache 8 is based on entries (not merely the head entry) in the fetch queue 68.

For example, if a given BTB entry specifies non-return branches in offsets 2, 3, and 7 and a return branch in offset 5, and the BDP 62 specifies a prediction of not-taken for offsets 2 and 3, taken for offset 7 (with the return branch being either unconditionally taken or predicted taken if the architecture supports conditional return branches), then the first taken branch would be the return branch at offset 5, and so the offset selected by the selector 66 would be the offset 5. The instruction addresses allocated to the fetch queue would correspond to instructions at offsets 0-5 from the fetch block address X. In contrast, if the non-return branch at offset 2 had been predicted taken by the BDP 62, then the fetched instructions would comprise the instructions at offsets 0-2 from the fetch block address X, as instructions beyond the first taken branch in the block would not be fetched.

The next fetch block address X selected by selector 66 is provided to an address selector 70 which selects which address is used as the fetch block address X in the next branch prediction cycle. For most cycles, the next fetch block address X from one branch prediction cycle is used as the fetch block address X for the following cycle. However, if there is a system reset, interrupt or branch misprediction, then the program counter may be set to a new value (e. g. a reset value, interrupt handler address or misprediction address), and the new program counter value may be supplied as the fetch block address X for the first branch prediction cycle after processing restarted following the reset, interrupt or misprediction.

The call-return stack 64 is provided to improve prediction accuracy when function or procedure calls and returns are made within the code being executed. A procedure or function call refers to the calling of a certain sequence of instructions from a particular location within the program code being executed, where it is intended that once the function or procedure has finished, then processing returns to the instruction after the calling instruction which called the function or procedure. The same function or procedure may be called from a number of different locations in the code, and so often the target address of return branch instructions may differ depending on the location from which the function or procedure was called. This can make it difficult to predict the target address of the return branch instruction using the BTB 60, which is why a dedicated return branch address prediction structure may be provided in the form of a call-return stack 64. In the examples below, the term "procedure" is used for conciseness, but is intended to encompass either a procedure or a function.

In these examples, prediction information in the form of a predicted direction from the BDP 62 and hit/miss information from the BTB 60 is stored in association with each instruction in the fetch queue 68. When an instruction is passed from the instruction cache 8 to the decode stage 10, the corresponding prediction information stored in the fetch queue 68 for that instruction is used by post fetch correction circuitry 69, together with an initial pre-decoding of the instruction, to determine whether the contents of the fetch queue 68 have been corrected determined. In the event that the contents of the fetch queue 68 are considered to be incorrect (for instance if the contents of the fetch queue are considered to have been fetched sequentially where the prediction information suggests that a branch should have been taken), the contents of the fetch queue can be flushed and replaced with addresses to instructions along a revised control flow path.

Figure 3:
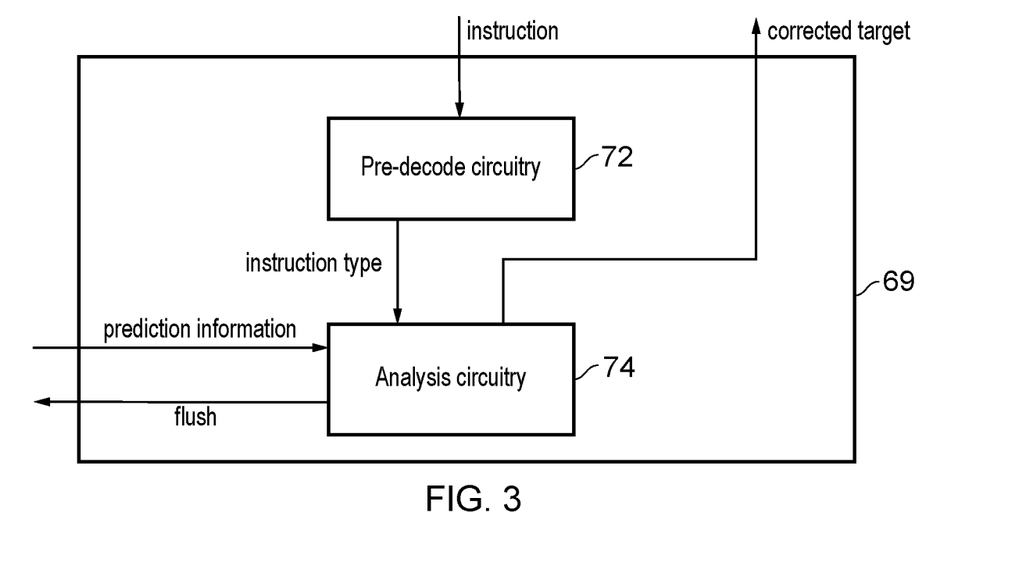
FIG. 3 illustrates an example of the post-fetch correction circuitry in accordance with some examples.

FIG. 3 illustrates an example of the post-fetch correction circuitry 69 in more detail. The circuitry includes pre-decode circuitry 72 that receives an instruction, e.g. the one indicated by a head of the fetch queue 68 on its path from the instruction cache 8 to the decoder 10. The pre-decode circuitry performs an initial decoding. This initial decode is not as complete as performed by the decoder 10 and therefore can be performed more quickly than the decoder. For instance, the pre-decode circuitry 72 might only consider part of the opcode of the instruction in order to determine an instruction type (e.g. whether the instruction is a control flow instruction and/or whether the control flow instruction is conditional). This information is provided to analysis circuitry 74 that takes a decision of whether to flush the fetch queue 68 and provide an adjusted target (e.g. the target of a branch) to the selector 66. The analysis circuitry 74 considers not only the instruction type, but also prediction information provided in respect of the instruction, which is obtained from the fetch queue 68.

Where a flush occurs, it might also be necessary for any global history data (e.g. as provided in the GHR 71 for a global-history based BDP 62 like TAGE or perceptron) to be updated. This could include deleting recent entries in the GHR that correspond with the flushed entries on the fetch queue 68, for instance, as well as changing an entry for the instruction for which the post-fetch correction circuitry 69 has made the correction. It is not necessary for the entire fetch queue 68 to be flushed. In particular, for a particular instruction for which a correction has been made, there is no need for instructions prior to that instruction in the fetch queue 68 to be flushed. This is because a change to the prediction of the particular instruction has no effect on whether or not earlier instructions are executed.

Figure 4:
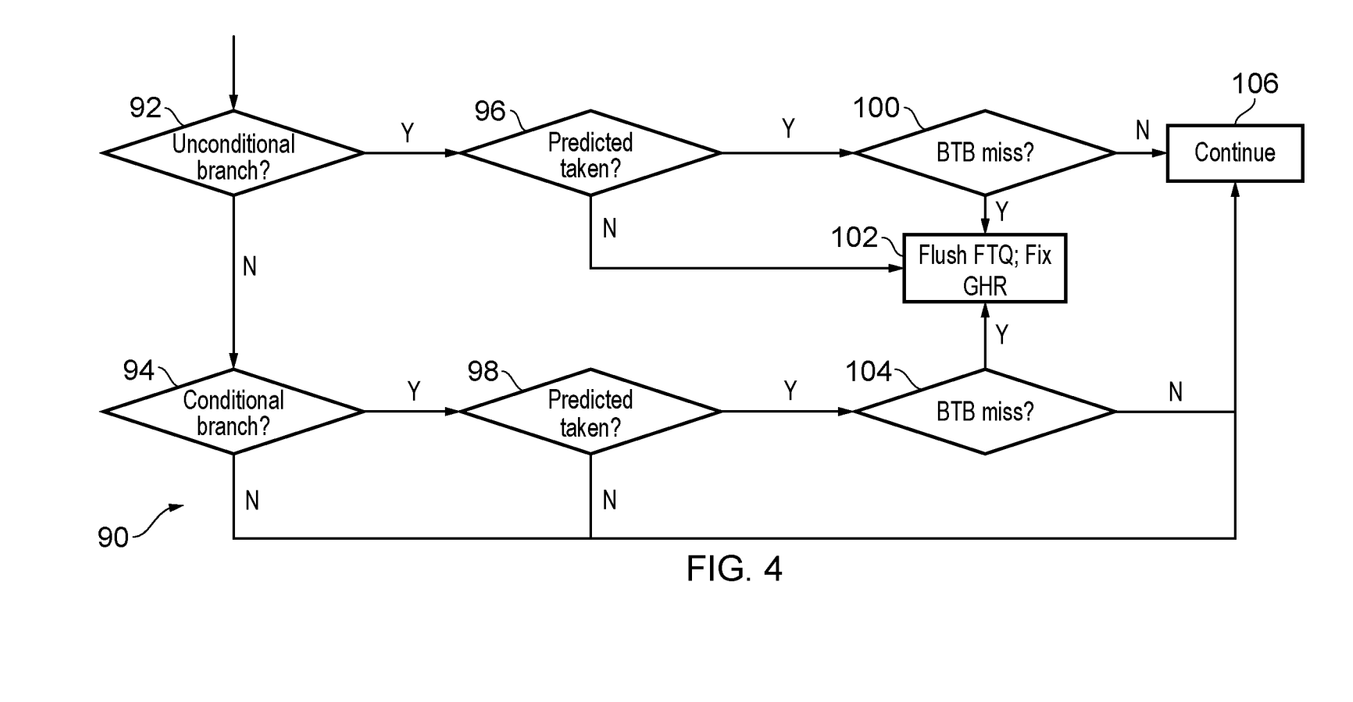
FIG. 4 contains a flow chart that illustrates an example decision making process that can be made by the post-fetch correction circuitry in accordance with some examples.

FIG. 4 contains a flow chart 90 that illustrates an example decision making process that can be made by the post-fetch correction circuitry 69. At a step 92, it is determined whether the received instruction is an unconditional control flow instruction (e.g. an unconditional branch). An unconditional control flow instruction can be considered to be one in which the question as to whether the branch is taken or not is not dependent on the outcome of another result. That is, the branch is always taken. That is not to say that the location of the branch is known, however (i.e. the branch target need not be static). If the branch is unconditional then at step 96, it is determined whether the prediction information indicates, from the BDP 62, that the branch is predicted taken or not. Note that the BDP 62 is not necessarily even aware that a given instruction is a branch instruction (let alone whether it is conditional or not) and therefore the BDP 62 may appear to indicate that an unconditional branch instruction is predicted to be not taken. If the prediction information in the fetch queue 68 indicates that the prediction is for the branch to be taken, then at step 100, it is determined whether a BTB 60 miss occurred. If not, then the process continues at step 106 and no correction is made. This is because the lack of miss in the BTB 60 meant that the fetch queue 68 has already been filled according to the provided predictions. Otherwise, if a BTB 60 miss did occur at step 100, then at step 102, the fetch queue 68 is flushed (and the GHR 71 is corrected if necessary). This represents a situation in which the BTB 60 missed and thus there was either no information available on whether a branch existed or the BTB 60 positively indicated that no branch was present. In either case, the fact that an unconditional branch is present and the fact that the BDP 62 indicates that the unconditional branch is likely to be taken is enough to cause an immediate flush of the fetch queue 68. Also at step 96, if the unconditional branch instruction is predicted not taken, then the flush also occurs at step 102. This is because an unconditional branch instruction will always be taken and hence the prediction made by the BDP 62 in order to fill the fetch queue 68 in inherently incorrect and so correction is to be performed.

If at step 92, the branch instruction is not unconditional then at step 94, it is determined whether the instruction is conditional. If not, then the process simply continues at step 106 because the instruction is not a branch/control flow instruction and so there is no correction to be performed. If so, then at step 98, it is determined whether the instruction is predicted taken. If not, then the entries in the fetch queue 68 were obtained sequentially and so again, the fetch queue has likely been filled correctly and so no correction is to performed—the process merely continues at step 98. If, at step 98, the control flow instruction is predicted taken then at step 104, it is determined whether a BTB 60 miss occurred. If not, then the system was aware of there being a branch instruction and so the fetch queue 68 was filled according to the available predictions and thus the process simply continues at step 68. Alternatively, if a miss occurred at step 104 then there is a reasonable likelihood that the fetch queue was filled sequentially despite the presence of a branch instruction that is likely to be taken and so the correction takes place at step 102.

Figure 5:
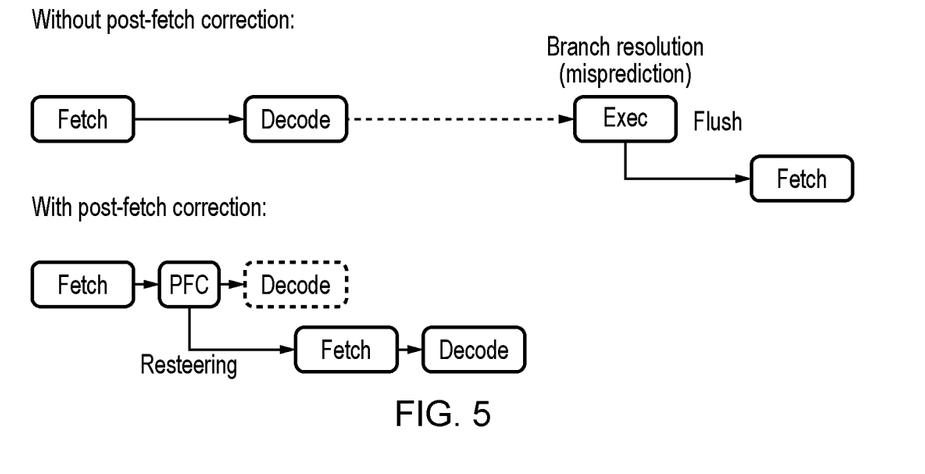
FIG. 5 illustrates the effect of correcting for the miss that occurs in the BTB in some examples.

FIG. 5 illustrates the effect of correcting for the miss that occurs in the BTB. In this example, it is assumed that a given block of instructions contains a branch instruction that will be taken. However, due to the limitations of capacity, the BTB is not aware that the branch instruction exists. Consequently, output from the BDP is given no weight.

Where the post-fetch correction circuitry 69 is not applied, an instruction will be fetched and decoded and finally executed. Since the BTB misses, blocks of instructions subsequent to the current block of instructions are fetched (e.g. blocks X+1, X+2, . . . ). That is, the control flow is assumed to proceed without any branching taking place. At a time of execution, it is discovered that a block of instructions did, in fact, contain a control flow instruction (contrary to the indications of the BTB) and that the branch is to be taken. When the branch is resolved, therefore, it is determined that a branch should have occurred and the instruction blocks that follow sequentially have been incorrectly inserted into the fetch queue 68. This therefore results in a flush of the pipeline. However, this flush occurs sometime after the fetching and decoding has occurred and the intervening time is therefore wasted.

In contrast, where the post-fetch correction circuitry 69 is applied after the fetch stage occurs, it is immediately possible to make an 'improved' prediction that a branch instruction is likely to exist within the instruction block (again contrary to the indications of the BTB) and that such a branch is likely to be taken. As a result, the fetch queue 68 can be immediately flushed and resteering can occur. Where the improved prediction is correct, this allows the flush to be performed more quickly and the intervening time is saved.

Figure 6:
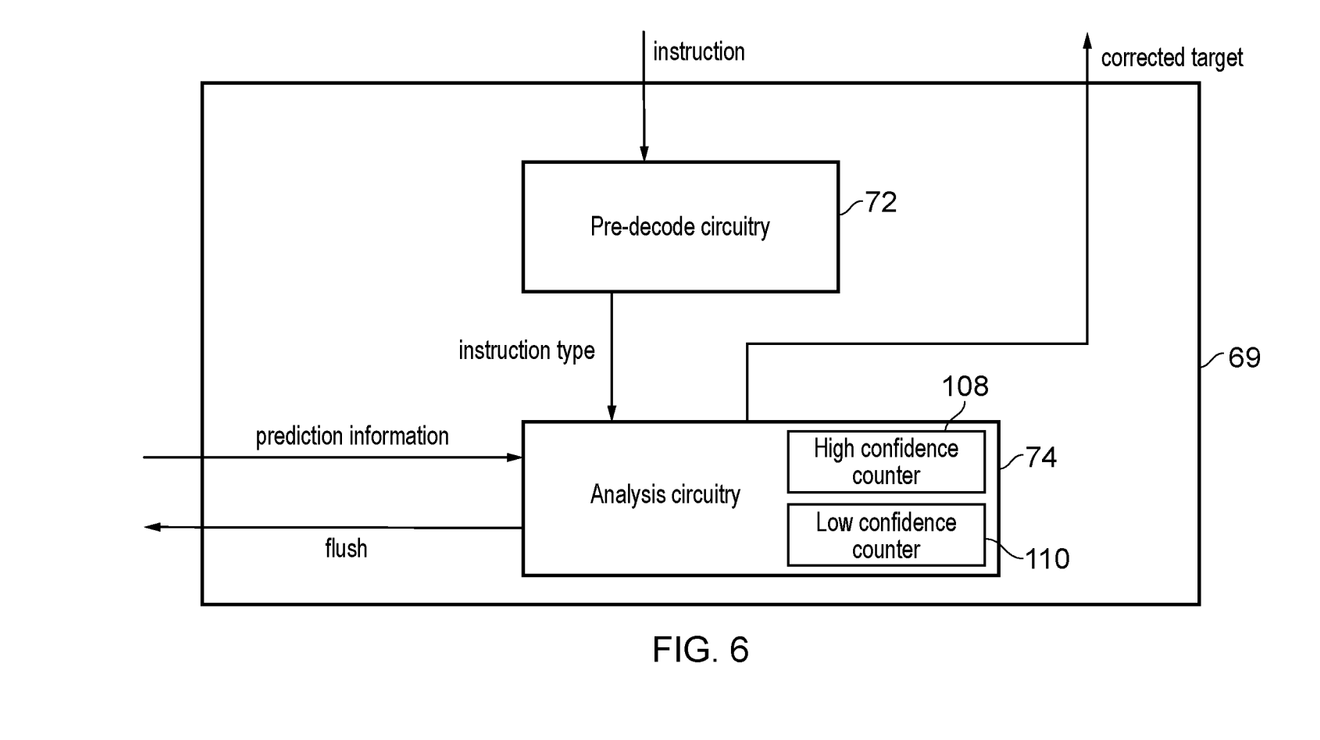
FIG. 6 illustrates an example in which the analysis/correction is applied selectively.

FIG. 6 illustrates an example in which the analysis/correction is applied selectively. In this example, instructions are categorised into a number of categories (e.g. two) based on a confidence value (e.g. of the BDP 62 for the particular instruction). A first counter 108 is used to assess the success rate of the post-fetch correction circuitry 69 on high confidence control flow instructions and a second counter 110 is used to assess the success rate of the post-fetch correction circuitry 69 on low confidence control flow instructions. There are a number of ways in which the counters can operate. However, in these examples, the counters are updated (for high and low confidence branch instructions respectively) on resolution of a branch instruction. In particular, if a branch instruction was predicted taken, and a BTB 60 miss occurred (e.g. if the post-fetch correction circuitry 69 should have been applied) and if the branch was actually taken in the execution of that branch instruction (therefore if post-fetch correction circuitry should have been applied and the result would be correct) then the counter is incremented. If a branch instruction was predicted taken, and BTB 60 miss occurred and if the branch was not taken (e.g. if the post-fetch correction circuitry 69 should have been applied, but this would have turned out to be incorrect) then the counter is decremented. In these examples, if the corresponding counter for a particular control flow instruction is positive, then the post-fetch correction circuitry 69 is applied. Otherwise it is not. The two counters therefore represent a likelihood of success, for each category of branch instruction, if post-fetch correction was applied. Note that since neither counter relies on post-fetch correction being applied in order to be changed, the counter can freely cause the activation and deactivation of post-fetch correction. That is, the situation does not arise in which post-fetch correction stops being applied and cannot be reactivated.

Figure 7:
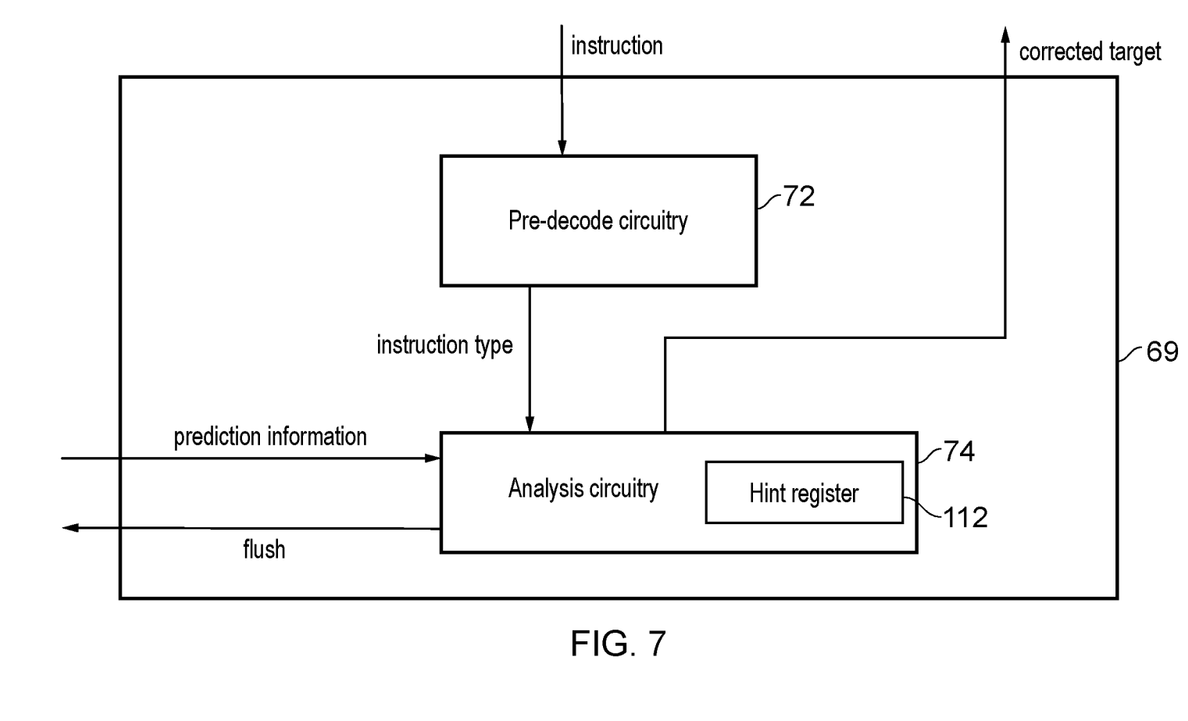
FIG. 7 illustrates an example in which a compiler hint register is provided.

FIG. 7 illustrates an example in which a hint register 112 is provided. The hint register can be written to by instruction code for a program by a typical register write instruction. In these examples, a compiler can perform profiling on the source code of a program to be compiled. This profiling can be used to provide an indication of whether post-fetch correction is likely to be successful or not. For instance, a program could be simulated many thousands of times with large numbers of combinations of parameters to determine whether, on average, post-fetch correction is beneficial or not. More complex profiling can also take place since the compiler (having an overall view of the program code and its structure) could be in a position to make a more informed assessment of whether post-fetch correction is likely to be successful and beneficial. Having made a determination as to whether post-fetch correction is applicable or not, this information can be added to the instruction code of a program in the form of a register write to the hint register 112. At runtime, the hint register 112 can be read in order to make a decision of whether to apply post-fetch correction or not. Such hints could override any determinations made based on the instruction type and prediction information or could be taken in combination with these factors. The hints could refer to specific instructions for which post-fetch correction should/should not be applied, could apply for a number of instructions, and/or could indicate a weighting that should be applied to any level of 'override' given. There are a number of ways in which such hints can be supplied from the compiler to the runtime system and other examples will be appreciated by the skilled person.

Up until now, it has been assumed that the post-fetch correction circuitry 69 is applied to an instruction represented by a head element of the fetch queue 68, and is applied as the instruction is passed from the instruction cache 8 to the decoder 10. However, it need not be the case that the post-fetch correction circuitry is only applied to the head element. Indeed, by applying the post-fetch correction circuitry 69 to elements of the fetch queue 68 other than the head, it is more likely that a partial flush of the fetch queue 68 can be applied rather than a full flush. One way in which this can be achieved is by performing the post-fetch correction process during the process of fetching instructions into the instruction cache 8 rather than applying the post-fetch correction process as an instruction is passed to the decoder 10.

Figure 8:
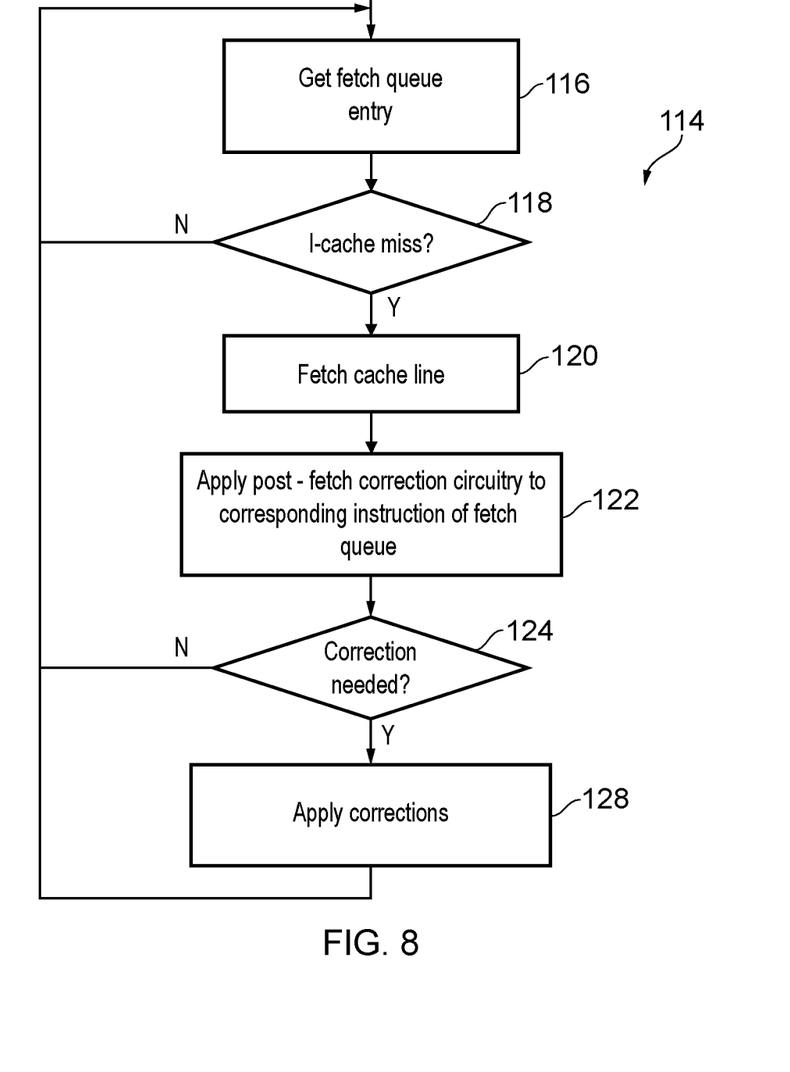
FIG. 8 contains a flow chart that illustrates a method of applying the post-fetch correction process during instruction fetches into the instruction cache.

FIG. 8 contains a flow chart 114 that illustrates a method of applying the post-fetch correction process during instruction fetches into the instruction cache 8. At a step 116, an entry from the fetch queue 116 is checked against the instruction cache 8. As previously, this need not be a head entry of the fetch queue 116. At a step 118, it is determined whether the entry misses on the instruction cache. In particular, if the entry of the fetch queue corresponds with an instruction that is found in the instruction cache then a hit will occur, and the process returns to step 116. Otherwise, a miss occurs, and the process proceeds to step 120 where the cache line is fetched. After fetching the cache line (e.g. from a lower level cache 32 or even from main memory 34), post-fetch correction circuitry 69 is applied at step 122 to the instruction in the cache line that corresponds with the fetch queue entry that was obtained at step 116. If, at step 124, it is determined that no correction is needed then the process returns to step 116. In contrast, if a correction is needed then at step 128, the correction is applied. Since fetching of instructions into the instruction cache 8 is expected to run ahead of the transition of an instruction from the instruction cache 8 to the decoder 10, it is expected that post-fetch correction can be applied sooner (where necessary). For instance, the post-fetch correction might be applicable to a middle entry of the fetch queue 68. Where this can be achieved, less of the fetch queue 68 needs to be flushed— only those instructions following the instruction (in the instruction stream) for which post-fetch correction is applied need to be flushed. Thus, in this example, only half of the fetch queue 68 would need to be flushed.

Figure 9:
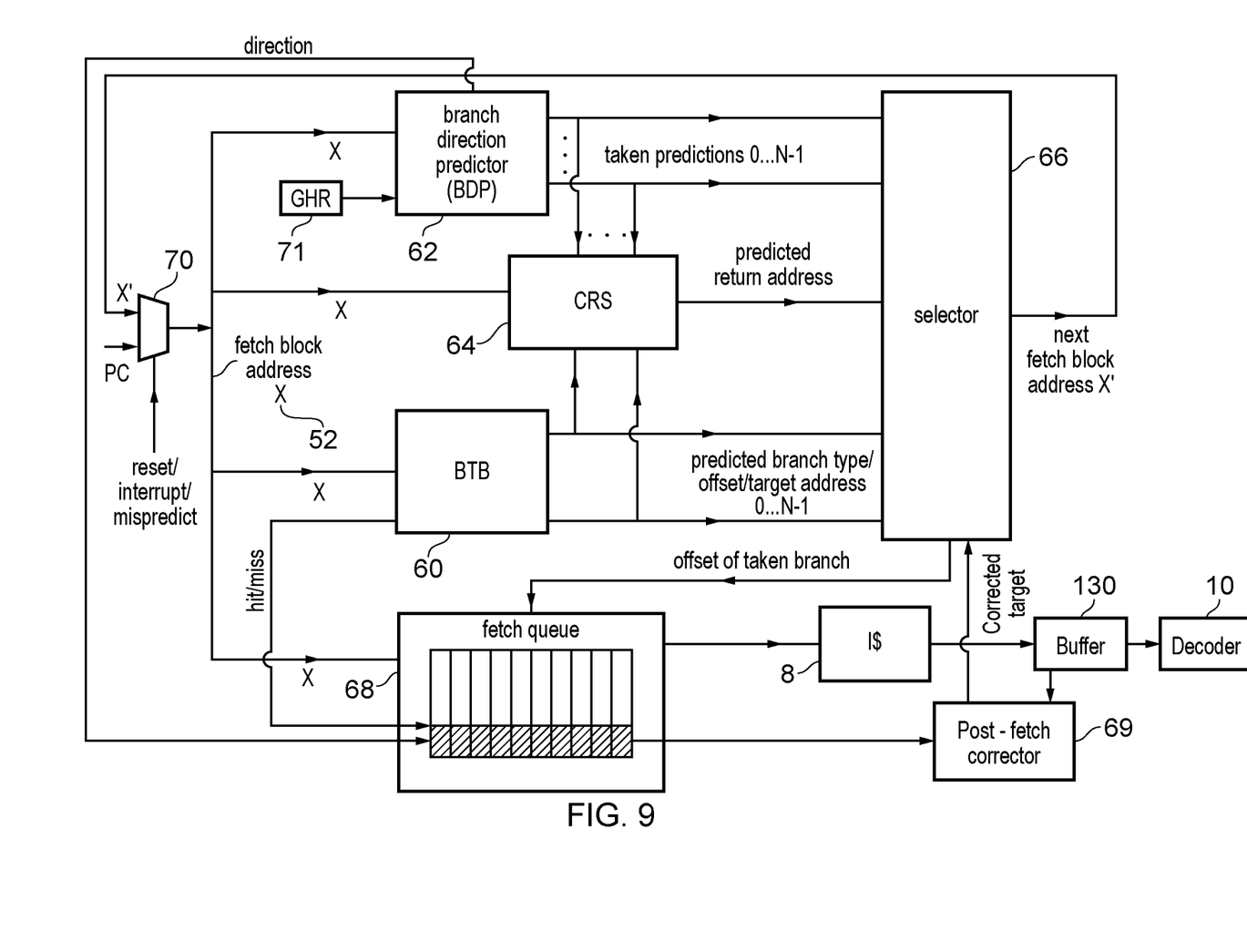
FIG. 9 shows the addition of an instruction buffer in accordance with some examples.

In the example of FIG. 9, an instruction buffer 130 is added that is able to store one or more instruction cache lines. In this way, it is possible for a plurality of instructions of the instruction cache 8 that are referred to in entries at the front of the fetch queue 68 to be provided into the buffer 130 where they can be assessed by the post-fetch correction circuitry 69. This makes it possible to analyse instructions that are not at a front of the fetch queue 68. However, it does not rely on the 'miss' mechanism previously described meaning that even instructions that are already in the instruction cache 8 (for which a miss would not occur) can be assessed by the post-fetch correction circuitry 69. Where a flush needs to take place, this means that only a portion of the fetch queue 68 needs to be flushed and so performance may not be degraded as much as occurs when the entirety of the fetch queue 68 is flushed.

Figure 10:
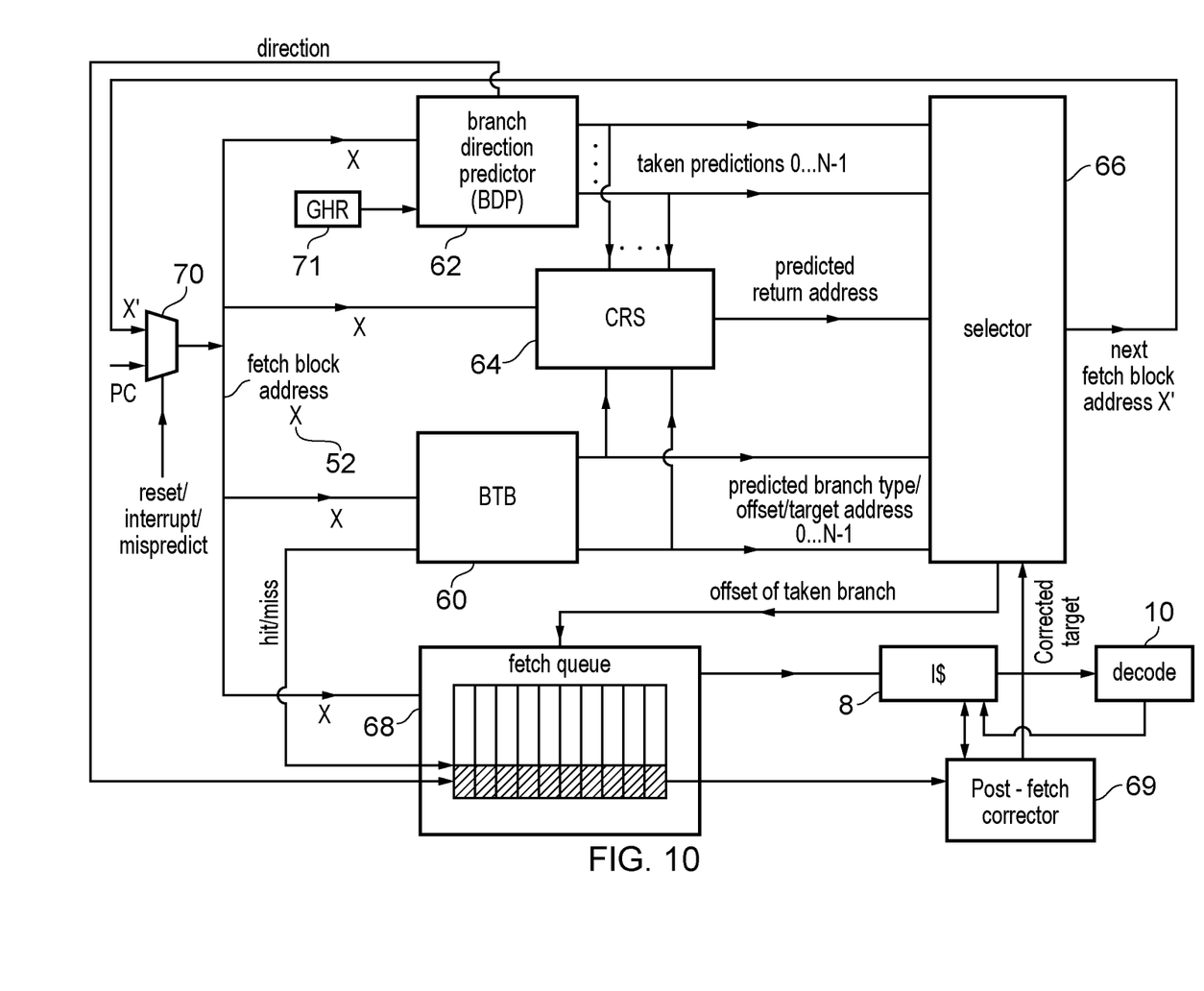
FIG. 10 shows a feedback mechanism from the decoder in accordance with some examples.

In the example of FIG. 10, a feedback mechanism is provided from the decoder 10 regarding information on an instruction. This information can be stored in the corresponding entry of the instruction cache 8 (e.g. in the tag array) and can include the locations of control flow instructions within the cache line and the types of those control flow instructions (e.g. conditional/unconditional). With this information, the post-fetch corrector 69 can access entries within the instruction cache 8 and perform the post-fetch corrections as necessary. Note that since the pre-decode process need not be performed (since the types of the instructions are already present in the instruction cache 8), the post-fetch correction process itself can proceed more quickly thereby making it possible for post-fetch correction to take place at the head entry indicated in the fetch queue 68. Again, this makes it possible for entries mid-way through the fetch queue 68 to be the cause of an at least partial flush, meaning that it may not be necessary to flush the entirety of the fetch queue 68. The analysis performed by the post-fetch correction circuitry 69 in FIG. 10 could occur, for instance, when an entry is added to the fetch queue 68.

As a consequence of the above techniques, it is possible to quickly correct potential branch prediction errors at a time of fetching/decoding instructions rather than waiting for execution of the instructions to take place before correction occurs. This can lead to a reduced penalty for mispredictions occurring.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
control flow detection prediction circuitry to perform a presence prediction of whether a block of instructions contains a control flow instruction;
a fetch queue configured to store, in association with prediction information, a queue of indications of the instructions, wherein the prediction information comprises the presence prediction;
an instruction cache configured to store fetched instructions that have been fetched according to the fetch queue;
post-fetch correction circuitry configured to, prior to the fetched instructions being received by decode circuitry, both:
receive the fetched instructions, and
cause the fetch queue to be at least partly flushed in dependence on a type of a given one of the fetched instructions and a given item of the prediction information associated with the given one of the fetched instructions.

2. The data processing apparatus according to claim 1, wherein
the post-fetch correction circuitry comprises:
predecode circuitry, separate from the decode circuitry, configured to perform an initial decoding, wherein the initial decoding is performed on the fetched instructions to provide the type of the given one of the fetched instructions.

3. The data processing apparatus according to claim 2, wherein
the predecode circuitry is configured to perform initial decoding on a head instruction indicated by a head of the fetch queue.

4. The data processing apparatus according to claim 2, wherein
the instruction cache is configured, in response to an entry of the fetch queue causing a miss in the instruction cache, to perform a fill from a lower level cache of a cache line corresponding to the entry and comprising a plurality of cache line instructions; and
the predecode circuitry is configured to perform the initial decoding on each of the plurality of cache line instructions in response to the fill.

5. The data processing apparatus according to claim 2, comprising:
an instruction buffer, configured to store further fetched instructions, wherein the further fetched instructions are indicated at a location in the fetch queue other than a head, wherein
the post-fetch correction circuitry is configured to receive the further fetched instructions;

the predecode circuitry is configured to perform the initial decoding on the further fetched instructions; and the post-fetch correction circuitry is configured to cause the fetch queue to be at least partly flushed in dependence on the initial decoding of a given further fetched instruction and a further given item of the prediction information associated with the given further fetched instruction.

6. The data processing apparatus according to claim 1, comprising:

control flow direction prediction circuitry configured to perform a direction prediction, wherein the prediction information comprises the direction prediction.

7. The data processing apparatus according to claim 6, wherein the control flow direction prediction circuitry is configured to perform the direction prediction on each instruction within the block of instructions.

8. The data processing apparatus according to claim 6, wherein the control flow direction prediction circuitry is configured to perform the direction prediction based on a global history; and the post-fetch correction circuitry is configured, in response to causing the fetch queue to be at least partly flushed, to cause the global history to be corrected.

9. The data processing apparatus according to claim 8, wherein the post-fetch correction circuitry is configured to cause the fetch queue to be at least partly flushed in response to the given one of the fetched instructions when the type of the given one of the fetched instructions and the given item of the prediction information indicate that contents of the fetch queue are incorrect.

10. The data processing apparatus according to claim 9, wherein the type of the given one of the fetched instructions and the given item of the prediction information indicate that the contents of the fetch queue are incorrect when the type of the given one of the fetched instructions and the given item of the prediction information indicate that a sequential fetch was performed to fill the fetch queue and the type of the given one of the fetched instructions and the given item of the prediction information indicate that the sequential fetch differs from a control flow indicated by the given instruction post-decoding.

11. The data processing apparatus according to claim 8, wherein the post-fetch correction circuitry is configured to cause the fetch queue to be at least partly flushed in response to the given one of the fetched instructions when the type of the given one of the fetched instructions indicates that the given one of the fetched instructions is a conditional control flow instruction and the direction prediction indicates that the conditional control flow instruction is taken and the presence prediction indicates that the block of instructions lacked a control flow instruction.

12. The data processing apparatus according to claim 1, wherein the post-fetch correction circuitry is configured to cause the fetch queue to be at least partly flushed in response to the given one of the fetched instructions when the type of the given one of the fetched instructions indicates that the given one of the fetched instructions is an unconditional control flow instruction and the presence prediction indicates that the block of instructions lacked a control flow instruction.

13. The data processing apparatus according to claim 1, wherein the post-fetch correction circuitry is selectively applied to the given one of the fetched instructions.

14. The data processing apparatus according to claim 1, wherein the post-fetch correction circuitry is selectively applied to the given one of the fetched instructions in dependence on a confidence value associated with whether the post-fetch correction circuitry would have previously correctly flushed the fetch queue.

15. The data processing apparatus according to claim 1, wherein the post-fetch correction circuitry is selectively applied to the given one of the fetched instructions in dependence on one or more compiler hints.

16. The data processing apparatus according to claim 1, wherein the instruction cache is configured to store, in association with the given one of the fetched instructions, the type of the given one of the fetched instructions; and the decode circuitry is configured to provide the type of the given one of the fetched instructions to be stored in the instruction cache in response to the given one of the fetched instructions being decoded by the decode circuitry.

17. A data processing method comprising:

performing a presence prediction of whether a block of instructions contains a control flow instruction;

storing in a fetch queue, in association with prediction information, a queue of indications of the instructions, wherein the prediction information comprises the presence prediction;

storing fetched instructions that have been fetched according to the fetch queue; and prior to the fetched instructions being received by decode circuitry:

receiving the fetched instructions, and causing the fetch queue to be at least partly flushed in dependence on a type of a given one of the fetched instructions and a given item of the prediction information associated with the given one of the fetched instructions.

\* \* \* \* \*